United States Patent

[11] 3,570,404

| [72] | Inventor | Kenneth E. Pope |
| | | Litchfield Park, Ariz. |
| [21] | Appl. No. | 739,066 |
| [22] | Filed | June 21, 1968 |
| [45] | Patented | Mar. 16, 1971 |
| [73] | Assignee | Unidynamics/Phoenix |
| | | Goodyear, Ariz. |

[54] ELECTRICAL PYROTECHNIC PROGRAMMING SYSTEM
5 Claims, 2 Drawing Figs.

| [52] | U.S. Cl. | 102/70.2 |
| [51] | Int. Cl. | F42b 5/08 |
| [50] | Field of Search | 102/70.2 |

[56] References Cited
UNITED STATES PATENTS
2,697,736  12/1954  Goldberg et al. ............ 136/6
3,420,176  1/1969  Pope ............ 102/70.2

*Primary Examiner*—Benjamin A. Borchelt
*Assistant Examiner*—Thomas H. Webb
*Attorney*—Cahill, Sutton & Thomas ABSTRACT: An electrical pyrotechnic programming system, including a pyrotechnic signal source for activating an electrical power source. The power source provides current to an electrical switching system, including individual switches responsive to velocity acceleration and barometric altitude. Closure of the switches after actuation of the electrical power source produces a pyrotechnic output signal by igniting bridge wires. The power source comprises parallel connected batteries, the first of which is a type known as a thermal battery, and the second of which is a more conventional nickel-cadmium battery.

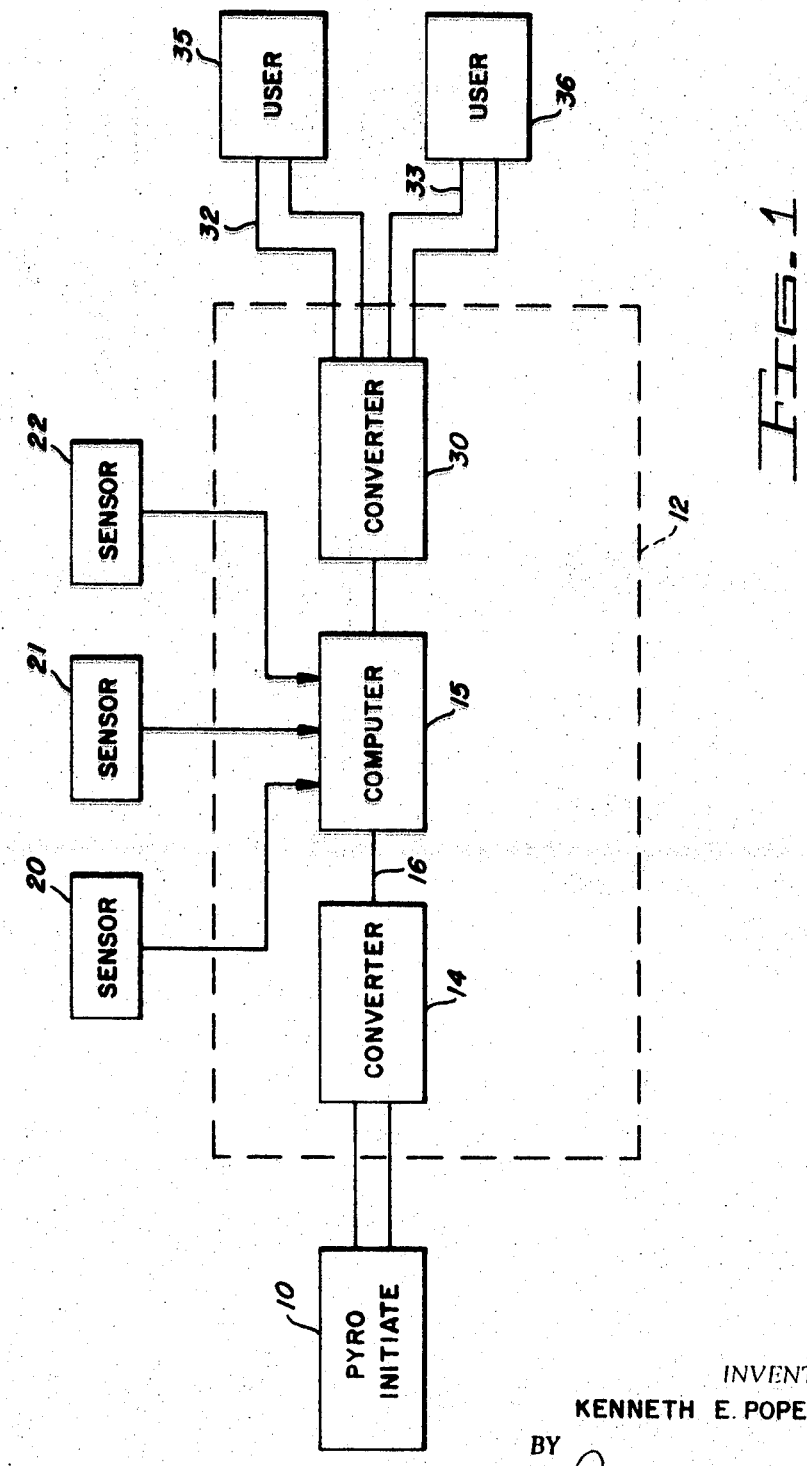

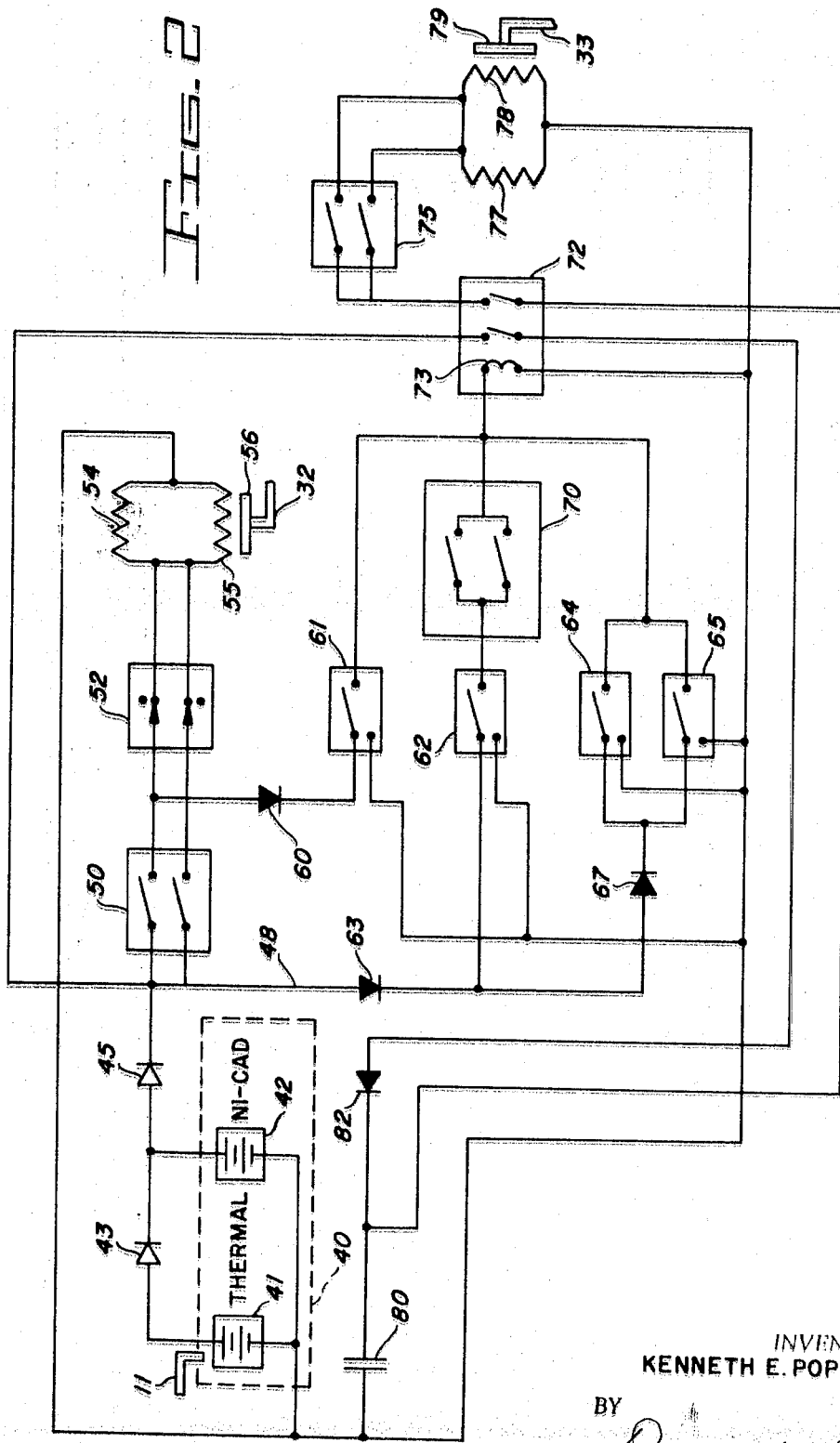

ELECTRICAL PYROTECHNIC PROGRAMMING SYSTEM

This application is a continuation-in-part of pending application Ser. No. 629,556, filed Apr. 10, 1967, entitled "Electrical Pyrotechnic Programming System," now U.S. Pat. No. 3,420,176, issued Jan. 7, 1969.

The present invention pertains to programming systems, and more particularly, to programming systems of the type utilized in pyrotechnic applications. In systems utilizing pyrotechnic devices such as ejection seat mechanisms for high-speed aircraft, it is important to trigger the pyrotechnic devices at predetermined intervals in accordance with environmental factors. The actuation of an ejector rocket to propel a pilot from an aircraft is customarily followed by subsequent pyrotechnic events predicated on such environmental factors as velocity, acceleration, and altitude.

Prior art pyrotechnic programming devices have utilized pyrotechnic time delays incorporating mechanical pyrotechnic train interrupters to program the sequence of events occurring after ejection. Typically, the pyrotechnic time delay would comprise a timing fuse interrupted by mechanical devices responsive to altitude, acceleration, and velocity. The utilization of pyrotechnic or mechanical delays is considerably less accurate and reliable than equivalent time delays utilizing electrical energy. Further, pyrotechnic time delays and time delay trains cannot be tested since such testing would automatically incorporate the destruction of the device.

Truly electrical programming systems require storage of electrical energy that may subsequently be utilized upon demand; further, power requirements of a pure electrical system as well as the susceptibility of such systems to RF fields render such programming systems generally unacceptable.

The storage of electrical energy in systems requiring absolute reliability is normally faced with conflicting requirements. In most instances, the weight and bulk of the storage is a prime factor while the energy stored is equally important although militating against miniaturization. Further, both long term shelf life or "dormant" storage and ability to deliver the stored energy over a predetermined period of time are desirable.

It is therefore an object of the present invention to provide a programming system responsive to a pyrotechnic input signal for providing a pyrotechnic output signal through the utilization of electrical energy.

It is a further object of the present invention to provide a programming system utilizing both pyrotechnic and electrical devices and incorporating a unique electrical energy storage arrangement.

These and other advantages of the present invention will become apparent to those skilled in the art as the description thereof proceeds.

Briefly, the present invention contemplates the utilization of an electrical power source responsive to a pyrotechnic input for providing power to an electrical computation system. The pyrotechnic input is converted into electrical energy by means of a dual battery system, the batteries of which differ in their capacities for shelf life and power delivery. The computation system will implement predetermined time delays as well as provide means for effecting necessary controls imposed by environmental sensors. The output of the electrical computation system is reconverted into a pyrotechnic output for use in a pyrotechnic system.

The present invention may more readily be described by reference to the accompanying drawings, in which:

FIG. 1 is a block diagram of an electrical pyrotechnic programming system constructed in accordance with the teachings of the present invention.

FIG. 2 is a circuit diagram and partial block diagram of the programming system constructed in accordance with the teachings of the present invention.

Referring to FIG. 1, a pyrotechnic initiation device 10 is shown for providing a pyrotechnic input signal to the programming system. The initiation device may typically be a percussion-type cap that may be electrically or mechanically actuated or triggered. The pyrotechnic signal thus generated is transmitted through a shielded mild detonating cord 11 to the programming system 12. The programming system 12 includes a pyroelectrical conversion system 14 for converting the pyrotechnic signal delivered to the programming system by the detonating cord into electrical power for utilization within the programming system. The pyroelectrical conversion system 14 provides electrical power to the electrical computation system 15 through electrical conductor 16. The electrical computation system 15 also receives a plurality of inputs from environmental sensors 20, 21, and 22. In the particular embodiment chosen for illustration, the environmental sensors 20, 21 and 22 are utilized to sense velocity, acceleration, and barometric altitude, respectively.

The output of the electrical computation system 15 is applied to an electropyrotechnic conversion system 30 which reconverts the electrical energy into pyrotechnic energy for subsequent utilization in the pyrotechnic system. The output of the electrophyrotechnic conversion system 30 also represents the output of the programming system 12. This output is in the form of an output pyrotechnic signal delivered over detonating cords 32 and 33 to pyrotechnic utilization devices 35 and 36, respectively.

Referring now to FIG. 2, the relationship to FIG. 1 is illustrated by the indication of the detonating cords 11, 32, and 33. Thus, it may be seen that FIG. 2 represents the programming system 12 of FIG. 1. A power source 40 is shown and comprises parallel connected batteries 41 and 42. The batteries are chosen for their specific characteristics and markedly differ from each other. Battery 41 is a specific type of battery known as a "thermal" battery. Such batteries have inactive and active states. Long shelf life is derived by reasons of the thermal battery being in its inactive state, in which state the electrolyte is in solid crystalline form, rendering the battery completely inactive. Such batteries have percussion caps on the top thereof which are actuated for heating the crystalline material to a molten form to thereby form a liquid electrolyte. When the crystalline material is in its molten form, the thermal battery is in its active state and produces an electrical current in a manner similar to conventional battery theory. However, the battery remains in its active state only as long as the electrolyte remains in the molten state; this limited time of the active state limits the time during which the stored energy may be utilized and the charge drawn therefrom. State of the art thermal batteries characteristically remain in the active state for a period of approximately 2 minutes, but exhibit a shelf life of up to 5 years. It may therefore be said that the thermal battery exhibits a substantially greater charge storage time when in the inactive state than a more conventional battery type. Similarly, the thermal battery, while in the active state, has a substantially lesser charge utilization time than a more conventional battery.

Battery 42 is a nickel-cadmium (Ni-Cad) battery and is connected to the thermal battery through a diode 43. The Ni-Cad battery 42 may be of a conventional design having a charge storage time significantly less than the thermal battery (Ni-Cad batteries for use in high reliability environments characteristically exhibit a self-discharge rate of from a few percent per month to as high as 25 or 35 percent per month). However, the charge utilization time may extend many times the charge utilization time available from a similar charge capacity thermal battery. The Ni-Cad battery 42 has a charged state and a discharged state and will normally occur in the power source 40 in the discharged state. The battery 42, characteristic of Ni-Cad batteries, can be rapidly charged to a significant percentage of their total charge storage capacity in a very short period of time and therefore may be utilized to store the energy contained in charge bursts derived from the thermal battery 41. Since the thermal battery will be in the inactive state and the Ni-Cad battery 42 will be in the discharged state, there is no stored electrical energy present in the programming system, and therefore no danger of short-circuiting or inadvertent release of energy prior to the programming system use.

The output of the electrical power source 40 is connected through a diode 45 to a common bus 48. A velocity-sensitive switch 50, commonly known in the art as a Q switch, is connected to the bus 48 and includes a pair of contacts that may be adjusted to close below a predetermined velocity and open above the predetermined velocity. The Q switch 50 is connected to an unlatch delay switch 52 which includes a pair of normally closed contacts that "unlatch" or open after a predetermined time delay triggered by the flow of current through the contacts. Such unlatching switches are well known in the art and are readily available having a variety of delay times for opening after the application of electrical current therethrough. The unlatch switch 52 is connected to a pair of bridge wires 54 and 55 that are responsive to electrical current flowing therethrough for generating a pyrotechnic output signal. The bridge wires are one type of pyrotechnic initiator that may be used to generate sufficient heat to activate the detonating cord 32. In some instances, it may be necessary to have a heat booster 56 to assist in the proper activation of the detonating cord in response to the actuation of the bridge wire.

The output of the Q switch 50 is also connected through a diode 60 to a time delay switch 61 which, in the embodiment chosen for illustration, represents a time delay of 1 second. A second time delay switch 62 is connected to the common bus 48 through a diode 63 and represents a time delay of 1.6 seconds. Dual time delay switches 64 and 65 are connected in parallel and are each connected to the common bus 48 through a diode 67. The time delay switches 64 and 65, in the embodiment chosen for illustration, represent time delays of 4.4 seconds. The output of the switch 62 is applied through an acceleration sensor switch 70 to a latching switch 72. Similarly, the switches 61, 64, and 65 are connected to the same latching switch 72. These switches are connected specifically to the actuating coil 73 of the latching switch 72 which, when actuated, will open the normally closed contacts and close the normally open contacts of the latching switch 72. The normally open contacts of the latching switch 72 are connected in series with a barometric altitude sensor switch 75 which, in turn, is connected to pyrotechnic initiators or bridge wires 77 and 78. The activation of the bridge wires 77 or 78 results in the initiation of a pyrotechnic signal with the help of the heat booster 79; the pyrotechnic signal is delivered to a pyrotechnic utilization device through the detonating cord 33.

The normally closed contacts of the latching switch 72 connect the positive side of the electrical power source 40 to a storage capacitor 80 through a diode 82. The storage capacity may typically be a low-leakage device such as a solid tantalum capacitor.

The purpose of the various elements of FIG. 2 as well as the operation of a preferred embodiment will now be described. It will be assumed that the programming system of the present invention is to be utilized to program events occurring after a pilot has been ejected from an aircraft. A pyrotechnic initiation device has therefore been triggered, either manually by the pilot or automatically by other means. The initiation device has resulted in the ejection of the pilot and the pyrotechnic signal input to the programming system. The pyrotechnic input is applied to the inactive electrical power source such as the batteries described previously. The electrical power source is thus converted to its active state and electrical power is provided to the electrical computation system of the programming system.

Referring now to FIG. 2, it may be seen that electrical power is applied to the Q switch 50. The switch may typically be calibrated to close when the velocity of the pilot is below 350 knots. The closure of the Q switch 50 applies power directly to the bridge wires 54 and 55, resulting in the generation of a pyrotechnic signal on the detonating cord 32. The pyrotechnic signal delivered on the cord 32 may be used for such pyrotechnic tasks as ignition of orientation rockets. The unlatch switch 52 will insure that only sufficient power is applied to the bridge wires 54 and 55 to activate the latter; in the event that the bridge wires should become shorted when they fire, the subsequent unlatching of the switch 52 will prevent undue current drain on the electrical power source. Actuation of the Q switch 50 to the closed position also applies power through the diode 60 to the one second delay switch 61. After the delay, the switch closes, energizing the relay coil 73, thus resulting in the opening of the normally closed contacts and closing of the normally open contacts of the latching switch 72. Opening of the normally closed contacts breaks the charging circuit wherein the capacitor 80 became charged from the electrical power source 40 after the latter assumed the active state. Closing of the normally open contacts of the latching switch 72 applies the stored charge on the storage capacitor 80 to the barometric altitude sensor switch 75. Typically, the switch 75 may be calibrated to close the contacts at an altitude below 15,000 feet. Thus, when the pilot reaches an altitude below 15,000 feet and the Q switch has been closed by reason of the pilot's velocity, the capacitor 80 will be discharged through the switch 75 and the bridge wires 77 and 78. The current flowing through the bridge wires 77 and 78 results in a pyrotechnic signal on the detonating cord 33. Typically, this pyrotechnic signal may be utilized to open the chute canister to result in the subsequent deployment of the parachute.

When the electrical power source 40 becomes active, electrical power is also applied to the bus 48 and thus to the delay switch 62. A one second delay after the application of electrical power to the switch 62 results in the application of power to the acceleration sensor switch 70. Typically, the switch 70 may be set to close contacts when the pilot's acceleration drops below 2.2g. The closing of the contacts of the switch 70 will apply electrical power to the relays coils 73, resulting in actuation of the bridge wires 77 and 78 as described previously. Without regard to the velocity (the state of the Q switch 50) or the pilot's acceleration (the state of the switch 70), the time delay switches 64 and 65 will energize the relay coil 73 after the time delay of 4.4 seconds. Therefore, as an emergency measure, the pilot's velocity and acceleration will be disregarded to effect a parachute deployment when the pilot's altitude drops below 15,000 feet.

Activation of the electrical power source 40 is a result of the receipt of a pyrotechnic signal causing the crystalline electrolyte of the thermal battery 41 to assume the molten state, thereby initiating the battery's charge utilization time. The current immediately flows through the diode 43 and is divided between the programming system connected to the diode 45 and the Ni-Cad battery 42. The current drain on the thermal battery as well as the recrystallization of the electrolyte therein causes the voltage present in the thermal battery 41 to drop; at the time the voltage drops to rearwardly bias the diode 43, the charge that has been stored in the Ni-Cad battery is utilized to continue supplying energy to the programming system.

It may therefore be seen that the parallel connected batteries 41 and 42 provide a very extended shelf life or charge storage time while nevertheless providing an extended charge utilization time even though the thermal battery is available for discharge for a very limited period. Further, it may be seen that the capacitor 80 may be provided to supplement the charge stored in the Ni-Cad battery and may also be used as an auxiliary charge storage device to assure actuation of the pyrotechnic output signal. It will be apparent that in the embodiment chosen for illustration, substantial redundancy was utilized in a manner typically found in applications requiring high reliability. Although the present programming system is pyrotechnically actuated, the system utilizes electrical time delay relays and other sensing devices that are considerably more reliable and accurate than pyrotechnic or mechanical devices of similar types. The electrical computation system of the programming system of the present invention may be tested for accuracy of time delay, responsiveness to environmental changes, etc., without affecting the subsequent use of the system. The device of the present invention is completely passive to RF fields and energy since no electrical connections enter or leave the programming system, thereby permitting the system to be mounted in a completely enclosed and shielded housing.

I claim:

1. A programming system comprising: a pyrotechnic signal source; a first battery having either an active or an inactive state and being connected to said signal source in a manner to be responsive to pyrotechnic energy for conversion from said inactive state to said active state; a secondary battery having either a charged state or a normally discharged state connected to said first battery through a nonlinear conducting element for receiving an electrical charge from said first battery when the latter is in its active state, said second battery being responsive to said electrical charge for conversion to said charged state; a plurality of environmental sensing electrical switches; means electrically connecting said switches to said batteries; a pyrotechnic initiator connected to said switches in a manner to be responsive to the actuation of one of said switches and either the active state of said first battery or the charged state of said second battery for producing a pyrotechnic output signal.

2. The combination set forth in claim 1 wherein said first battery is a thermal battery and wherein said second battery is a nickel-cadmium battery.

3. In a programming system utilizing pyrotechnic input energy for initiation and a pyrotechnic output signal, and having a power source responsive to said pyrotechnic input energy for generating electrical power for said system, the improvement comprising: a first battery having an active state or an inactive state, said latter state condition being responsive to said pyrotechnic input energy for conversion to said active state; a second battery having a charged state or a discharged state and connected to said first battery in a manner for receiving an electrical charge from said first battery when the latter is in its active state, said second battery being responsive to current flow through a unidirectional current flow circuit element to provide said electrical charge for assuming said charged state.

4. The combination set forth in claim 3 wherein said first battery is a thermal battery and said second battery is a nickel-cadmium battery.

5. The combination set forth in claim 3 wherein said first battery has a substantially greater charge storage time when in said inactive state than said second battery has in said charged state and wherein said first battery has a substantially lesser charge utilization time when in said active state than said second battery in said charged state.